Patented May 7, 1929.

1,711,503

UNITED STATES PATENT OFFICE.

ARNOLD NESBITT MACNICOL, OF MELBOURNE, VICTORIA, AUSTRALIA.

PROCESS FOR MANUFACTURING EMULSIVE PREPARATIONS.

No Drawing. Application filed June 21, 1923, Serial No. 646,949, and in Australia July 7, 1922.

This invention relates to a process for manufacturing and preparing emulsive preparations such as dips, sprays or soaps and has been devised in order to provide such an emulsion miscible in cold water which is of greater utility than those at present in use.

An essential feature embodied in this invention consists in the preparation or manufacture of soaps, emulsive dips, or sprays from arsenic or arsenic compounds and wool fat.

Emulsive preparations having an arsenical base are known, but this invention, while providing for the use of arsenic or arsenic compounds, is directed more particularly to the addition of wool fat and a caustic alkali, such as sodium hydrate or potassium hydrate.

In practice the wool fat and the caustic alkali may be first mixed together and the resulting emulsion mixed with the arsenic, or a compound of arsenic and sodium or potassium hydrate may be directly emulsified with the wool fat.

According to this invention a solution may be prepared from an arsenic salt. The wool fat is then added slowly while the solution is agitated in an emulsifier of any suitable construction. The solutions are heated to 40° Cent. to 50° Cent. and when fats are used they are first melted before addition to the solution.

The wool fat may also be emulsified with solutions of arsenic salts or compounds by adding to the mixture the amide of a higher fatty acid or an acidyl derivative of an aromatic base or both with the salt of a higher fatty acid, the liquids and fats being heated to a temperature of 90° Cent. to 100° Cent.

The product may be prepared in the following manner:—

The wool fat may be emulsified with sodium or potassium arsenic or caustic alkali may be added to arsenious oxide to form the arsenite with or without an excess of the caustic alkali which emulsifies the wool fat. In either case a colloidal protein such as glue, gelatine or casein or starch may be added which forms a protective colloid to the emulsion.

For the manufacture of the product seven parts of a caustic alkali in solid state are added to thirty-three parts of water and this solution is stirred into seventy parts of molten anhydrous wool fat to which may be added other animal oils or fats if required.

The mixture is then heated for about two hours preferably in a water bath or steam-jacketed vessel and any water that evaporates is made up to the original bulk of the mixture.

As the composition of the wool fat is variable it is necessary to test the mixture at frequent intervals to determine if the emulsion is complete, and these tests should start when the mixture has been heated for an hour and continued at intervals until it is found the emulsion is complete. A temperature of 90° Cent. to 105° Cent. is satisfactory in the preparation of the compound.

After the emulsion is complete twenty parts of water are added while it is still warm.

To one hundred parts by weight of this compound are added one hundred parts by weight of sodium arsenite in fine powder and the cold mixture is thoroughly incorporated.

After the mixture is complete a small amount of colloidal protein such as gelatine, casein, isinglass or starch is added. This forms a protective colloid and the amount should be from one to two per cent. The protein should first be dissolved in a little water to which, in the case of casein, a little sodium carbonate has been added to facilitate solution.

A further method of manufacture consists in preparing a thirty-three per cent solution of sodium or potassium hydrate and adding to two parts of this solution one part of arsenious oxide. When the liquid has cooled to about 40° Cent. to 50° Cent. two or three parts of this solution are thoroughly incorporated with two parts of molten anhydrous wool fat to which has been added, if required, 10% to 20% tallow or other animal fats or oils. This is effective when it is found that the emulsion does not take place readily without it, owing to the considerable variations found in the quality of the wool fat.

This mixture is heated at 90° Cent. to 105° Cent. until it becomes nearly solid and the result appears to be a soap which is very soluble in water.

During the adding of the fats and the heating thereafter the liquid is continually stirred or rolled and if this is continued a creamy emulsion is produced.

A small amount of gelatine, casein, isinglass or other colloidal protein or starch amounting to about 1% to 3% is then added.

The proportions may be considerably varied as much more arsenious oxide may be added than above stated, but it has been found in practice an advantage to have an excess of the caustic alkali such as sodium or potassium hydrate, which assists in the emulsifying of the wool fat.

It will be found that the product formed in accordance with the invention is readily soluble in cold water.

In carrying the invention into effect other suitable substances being arsenic compounds may take the place of the arsenious oxide without departing from the spirit and scope of the invention and the resultant products constitute solutions or soaps of great commercial utility.

I claim:—

1. A process for manufacturing arsenical soaps comprising mixing wool fat with a caustic alkali and an alkali arsenite, and emulsifying the resulting mixture.

2. A process of manufacturing arsenical soaps comprising mixing wool fat with a caustic alkali and an alkali arsenite, and emulsifying the resulting mixture by agitation.

3. A process of manufacturing arsenical soaps comprising mixing wool fat with a caustic alkali, and then emulsifying the resulting compound with an alkali arsenite.

4. A process of manufacturing arsenical soaps comprising mixing wool fat with a caustic alkali, subjecting the resulting compound to heat, and then emulsifying said compound with an alkali arsenite.

5. A process of manufacturing arsenical soaps comprising mixing seventy parts of wool fat with a caustic alkali solution, formed by dissolving seven parts of a caustic alkali in solid state in thirty three parts of water, and twenty parts of water, adding to one hundred parts of this compound one hundred parts of an alkali arsenite, and emulsifying the resulting mixture.

6. A process of manufacturing arsenical soaps comprising mixing seventy parts of wool fat with a caustic alkali solution, formed by dissolving seven parts of a caustic alkali in solid state in thirty three parts of water, heating the resulting compound about two hours at a temperature of 90° C.–105° C., adding twenty parts of water, then adding to one hundred parts of this compound after it has cooled to room temperature one hundred parts of an alkali arsenite, and emulsifying the resulting mixture.

7. A process of manufacturing arsenical soaps comprising mixing seventy parts of wool fat with a caustic alkali solution, formed by dissolving seven parts of a caustic alkali in solid state in thirty three parts of water, heating the resulting compound about two hours at a temperature of 90° C.–105° C., adding twenty parts of water, then adding to one hundred parts of this compound after it has cooled to room temperature one hundred parts of an alkali arsenite and emulsifying the resulting mixture, and then adding 1–2% of a colloidal protein to form a protective colloid for the emulsion.

Signed at Sydney, N. S. W., Australia, this 22nd day of May, 1923.

ARNOLD NESBITT MACNICOL.